US005492788A

United States Patent [19]

Denton et al.

[11] Patent Number: 5,492,788

[45] Date of Patent: Feb. 20, 1996

[54] SYSTEM FOR REPLENISHING LIQUID ELECTROSTATIC DEVELOPER

[75] Inventors: Gary A. Denton; Michael J. Levy, both of Webster, N.Y.

[73] Assignee: Xerox Corporation, Stamford, Conn.

[21] Appl. No.: 317,009

[22] Filed: Oct. 3, 1994

[51] Int. Cl.$^{6}$ ........ C09D 11/10; B01F 11/00

[52] U.S. Cl. ........ 430/137; 366/276

[58] Field of Search ........ 430/117, 112, 430/137; 366/243, 276

[56] References Cited

U.S. PATENT DOCUMENTS

| | | | |
|---|---|---|---|
| 4,707,112 | 11/1987 | Hartmann | 430/117 |
| 4,869,847 | 9/1989 | Leslie et al. | 252/299 |
| 5,004,165 | 4/1991 | Landa et al. | 241/21 |
| 5,048,762 | 9/1991 | Landa et al. | 241/21 |
| 5,078,504 | 1/1992 | Landa et al. | 366/118 |

*Primary Examiner*—John Goodrow
*Attorney, Agent, or Firm*—Lloyd F. Bean, II

[57] ABSTRACT

System and process for replenishing liquid developer in equipment, such as a printer, whereby the percent of toner solids is maintained at about 0.5 to 4% by weight based on the total weight of liquid developer, the system comprising at least one liquid toner concentrate vessel containing aggregates of thermoplastic resin particles, median particle size (volume weighted) greater than 15 μm, and with 90% of the particles (volume weighted) not less than 30 μm, composed of 50 to 100% by weight of particles and 0 to 50% by weight carrier liquid; a liquid vessel containing carrier liquid, means communicating each of said vessels with a dispersing vessel containing electric field means for breaking apart agglomerates of liquid toner, wherein contents of the liquid toner concentrate vessel and the liquid vessel are supplied thereto and the resin particles are dispersed in the carrier liquid to form particles having a median particle size (volume weighted) of less than 15 μm, and with 90% of the particles (volume weighted) less than 30 μm in an amount of about 0.5 to 20% by weight of resin particles and about 99.5 to 805 by weight carrier liquid the dispersion being supplied and metered into the supply vessel containing original liquid developer to maintain the desired weight of solids. The system is useful in copying, proofing and ets., and the liquid developer is useful for making copied, proofs, lithographic printing plates and resists.

23 Claims, 1 Drawing Sheet

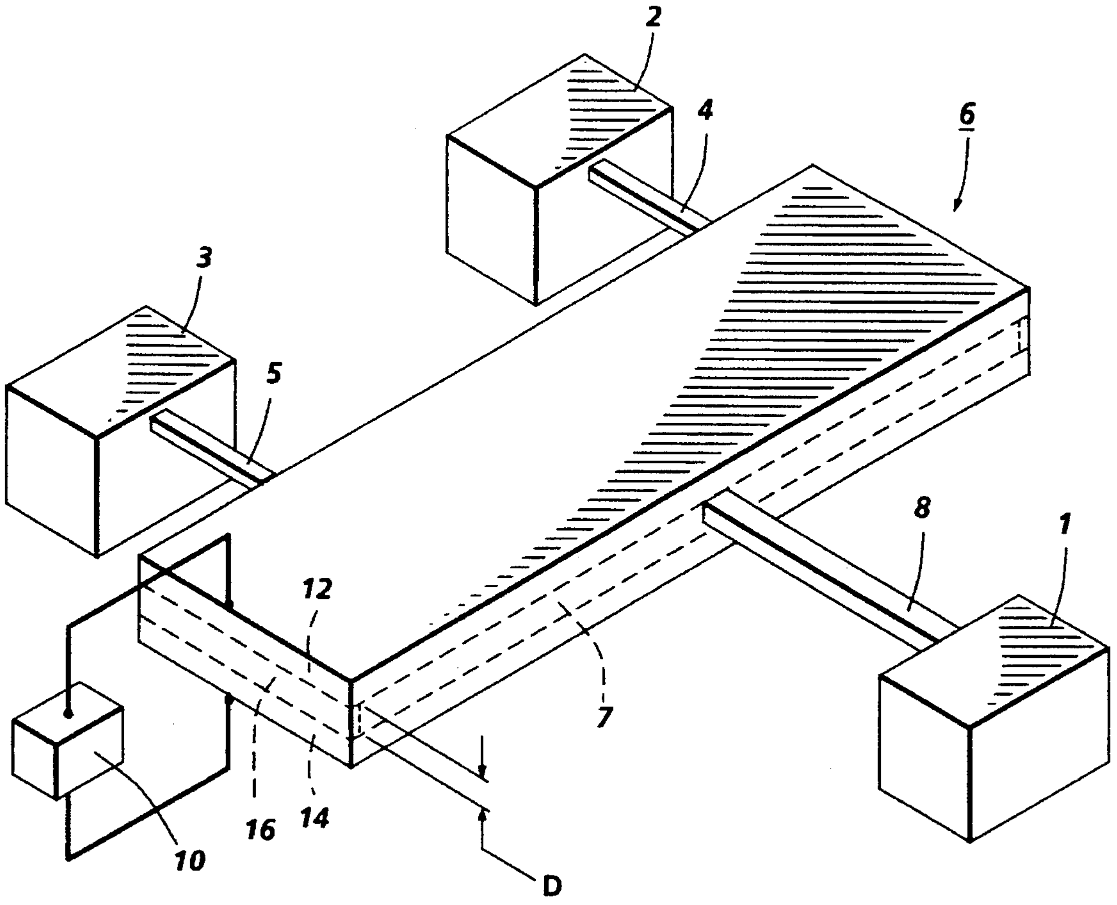
2
4
6
3
5
8
1
12
7
16
14
10
D

SYSTEM FOR REPLENISHING LIQUID ELECTROSTATIC DEVELOPER

This invention is generally directed to liquid developer processes, and, more specifically, the present invention relates to the preparation of ink dispersions. More specifically, the present invention relates processes and apparatus for obtaining excellent ink dispersions by economical electric field applications and preferably by subjecting the liquid inks to pulsed electric fields which, for example, enable agglomerates of the ink or developer to break apart or fracture thereby providing for the efficient desirable dispersion of the ink solids in the ink carrier fluids.

BACKGROUND OF THE INVENTION

Liquid electrostatic developers having chargeable toner particles dispersed in an insulating nonpolar liquid are well known in the art and are used to develop latent electrostatic images. Ideally, such liquid developers should be replenishable in the particular equipment in which they are used.

In general, high solids concentration toners are used for replenishment because relatively low concentrations (e.g., in the range of 10 to 15% by weight solids) result in greater liquid build-up in the equipment, which then must be removed and disposed of as hazardous waste. Thus, it is desirable to initially use a toner containing less liquid, and to maintain the working source located within the equipment, thereby minimizing the undesirable accumulation of carrier liquid in the equipment.

When toners are present in the liquid developer in more concentrated form, however, they become difficult to redisperse in the carrier. For example, aggregates may be formed. This can cause serious problems in the replenishment of the liquid developer in the equipment being use.

It has been known to use high shear forces between two closely spaced cylindrical surfaces to dissociate liquid toner particles as disclosed in U.S. Pat. Nos. 5,004,165, 5,048,762, and 5,078,504. These methods have been found acceptable for some applications. However, these dispersion apparatus have the disadvantage in that they require high tolerance, costly mechanical parts to create hydrodynamic sheer and thereby disperse the toner. A need to provide a less expensive and non-mechanical method for dispersing liquid toner still remains.

SUMMARY OF THE INVENTION

It has been found that the above disadvantages can be overcome and liquid developer replenished in the equipment by means of a system whereby aggregated toner that is present is reduced in size by applying a pulse of electric field to the liquid developer to disperse the toner particles in carrier liquid.

Accordingly, this invention provides a system for replenishing a liquid electrostatic developer present in a supply vessel, the liquid developer consisting essentially of (A) a nonpolar liquid having a Kauri-butanol value of less than 30, (B) thermoplastic resin particles having a median particle size (volume weighted) less than 15 μm, and with 90% of the particles (volume weighted) less than 30 μm, and (C) a charge director compound, the percent of solids in the developer being about 0.5 to 6% by weight based on the total weight of liquid developer; the system comprising (1) at least one liquid toner concentrate vessel containing aggregates of thermoplastic resin particles having a medial particle size (volume weighted) not less than 30 μm, composed of 30 to 100% by weight of particles (B), 0 to 50% by weight of component (A) being present in the vessel;

(2) a liquid vessel containing component (A);

(3) means for supplying aggregates of thermoplastic resin particles from the liquid toner concentrate vessel to a dispersing vessel;

(4) means for supplying component (A) from the liquid vessel to a dispersing vessel;

(5) a dispersing vessel containing high electric field means for breaking apart aggregates, said vessel (i) receiving thermoplastic resin particles from liquid toner concentrate vessel and component (A) from a liquid vessel and (ii) dispersing the aggregates of the thermoplastic resin particles in component (A) to form resin particles having a median particle size (volume weighted) less than 15 μm, with 90% of the particles (volume weighted) less than 30 μm, said dispersion containing about 0.5 to 20% by weight particles (B) and about 99.5 to 80% by weight component (A).

BRIEF DESCRIPTION OF THE DRAWINGS

The accompanying FIGURE is a schematic of a system wherein liquid electrostatic developer is replenished by means of supplied dispersed toner in accordance with the invention.

DETAILED DESCRIPTION OF THE INVENTION

The replenishment system of this invention can be understood by referring to the drawing, wherein all illustrated components are present in a piece of equipment, such as a printer, not shown.

The FIGURE illustrates an embodiment of the invention wherein supply vessel 1 contains a liquid developer consisting essentially of (A) a nonpolar carrier liquid having a Kauri-butanol value of less than 30, (B) thermoplastic resin particles (toner particles) having a median particle size (volume weighted) less than 15 μm, and with 90% of the particles (volume weighted) less than 30 μm which optionally may contain a dispersed colorant, and (C) a charge director compound, the percent of solids in the developer being abut 0.5 to 6% by weight based on the total weight of liquid developer. "Consisting essentially of" means that the liquid electrostatic developer may contain unspecified components that do not prevent the advantage of the liquid developer from being realized. The replenishment system enables the concentration of solids in the liquid developer to be maintained in the range of about 0.5 to 6% by weight, based on the total weight of liquid developer, using a liquid developer contained in supply vessel 1. The developer solids concentration is monitored by means known to those skilled in the art such as a calibrated light attenuation sensor.

The ingredients for the liquid developer are obtained from at least one liquid toner concentrate vessel 2 that contains aggregates of thermoplastic resin particles having a median particle size (volume weighted) greater than 15 μm, with 90% of the particles (volume weighted) not less than 30 μm. The concentrate is composed of 30 to 100% by weight of such particles and to 70% by weight nonpolar liquid (A). Vessel 3 contains liquid component (A). Means 4 and 5 respectively communicate with concentrate vessel 2 and liquid vessel 3 connecting said vessels with dispersing vessel 6 in order to supply vessel 6 with liquid toner concentrate from vessel 2 and nonpolar liquid from vessel 3. Communicating means 4 and 5 can be pipes, tubes, conduits, or the like, through which the toner concentrate and nonpolar liquid are supplied and metered (by means not shown) into vessel 6. Metering devices can be solenoid metering pumps, piston pumps, metered feed screws, peristaltic pumps, diaphragm pumps, or other metering devices selected on the basis of the physical characteristics of the material being transported.

Dispersing vessel 6 contains means for providing an electric field as shown in the FIGURE. Vessel 6 comprises two conductive plates 12 and 14 separated at the perimeter by an insulator 16. Conductive plates 12 and 14 are connected to voltage supply 10. When voltage is supplied to the plates 12 and 14, an electric field is transmitted through dispersing vessel 6, which enable agglomerates of the ink or developer to break apart or fracture thereby providing for the efficient desirable dispersion of the ink solids in the ink carrier fluids.

It has been found by Applicants that the agglomerates of toner particles disassociate in an almost explosive manner when subjected to electric fields of approximately 1500 V/mm for 30 milliseconds. It is believed that this response is due in large part to an intense mutual repulsion between the toner particles which results from stripping the oppositely charged micelles from the toner particles. It is possible that since the toner agglomerates also undergo rapid acceleration and move through the fluid at high speed in response to the electric field, that hydrodynamic forces may also play a role in the breakup of the toner agglomerates.

The pulsed of electric fields may be of alternated polarities to discourage the deposition of toner on either plate surface. The plate surfaces may be coated with dielectric materials to reduce the risk of arcing and to further reduce the adhesion of toner to these surfaces. It is preferred to apply the pulse of electric field in response to the flow of liquid developer moving through the vessel so that each agglomerates of toner that passes through the vessel is subjected to at least one electric field pulse.

Means 8, communicating with dispersing vessel 6, connects the vessel with supply vessel 1 containing the liquid developer to be replenished. Communicating means 8 can be pipes, tubes, conduits, or the like, through which the dispersed toner particles are supplied and metered (by means not shown) into said vessel as required to maintain the developer solids concentration in vessel 1 as measured by the solids concentration sensor (not shown). The metering device can be solenoid metering pumps, metered feed screws, peristaltiic pumps, piston pumps, diaphragm pumps, or other metering characteristics of the material being transported.

At least one of supply vessel 1, liquid toner concentrate vessel 2 or liquid vessel 3, can contain a charge director compound, more fully described below, in an amount of 0.1 to 1000 milligrams per gram of developer solids, preferably 1 to 300 milligrams per gram of developer solids. The specific ingredients used to make up the composition of the liquid electrostatic developer are described more fully as follows.

The nonpolar liquids (A) typically are branched-chain aliphatic hydrocarbons and more particularly, Isopar®-G, Isopar®-H, Isopar®-K, Isopar®-L, Isopar®-M, and Isopar®-V. These hydrocarbon liquids are narrow cuts of iso-paraffinic hydrocarbon fractions with extremely high levels of purity. For example, the boiling range of Isopar®-G is between 157° C. and 176° C., Isopar®-H between 176° C. and 191° C., Isopar®-K between 177° C. and 197° C., Isopar®-L between 188° C. and 206° C. and Isopar®-M between 207° C. and 254° C. and Isopar®-V between 254.4° C. and 329.4° C. Isopar®-L has a midboiling point of approximately 194° C. Isopar®-M has a flash point of 80° C. and an auto-ignition temperature of 338° C. Stringent manufacturing specifications limit impurities such as sulfur, acids, carboxyl, and chlorides to a few parts per million. They are substantially odorless, possessing only a very mild paraffinic odor. They have excellent odor stability and are all manufactured by Exxon Corporation. High-purity normal paraffinic liquids, Norpar®12, Norpar®13 and Norpar®15, Exxon Corporation, may be used. These hydrocarbon liquids have the following flash points and auto-ignition temperatures:

| Liquid | FLASH POINT (°C.) | Auto-Ignition Temp (°C.) |
|---|---|---|
| Norpar ® 12 | 69 | 204 |
| Norpar ® 13 | 93 | 210 |
| Norpar ® 15 | 118 | 210 |

All of the nonpolar liquids have an electrical volume resistivity in excess of $10^9$ ohm centimeters and a dielectric constant below 3.0. The vapor pressures at 25° C. are less than 10 Torr. Isopar®-G has a flash point, determined by the tag closed cup method, of 40° C., Isopar®-H has a flash point of 53° C. determined by ASTM D 56. Isopar®-L and Isopar®-M have flash points of 61° C., and 80° C., respectively, determined by the same method. While these are the preferred nonpolar liquids, the essential characteristics of all suitable nonpolar liquids are the electrical volume resistivity and the dielectric constant. In addition, a feature of the nonpolar liquids is a low Kauri-butanol value less than 30, preferably in the vicinity of 27 or 28, determined by ASTM D 1133.

The ratio of thermoplastic resin to nonpolar liquid is such that the combination of ingredients becomes fluid at the working temperature. The nonpolar liquid is present in an amount of 94% to 99.5% by weight, preferably 97 to 99% by weight, based on the total weight of liquid developer. The total weight of solids in the liquid developer is about 0.5 to 6%, preferably 1 to 3% by weight. The total weight of solids in the liquid developer is solely based on the resin, including any components dispersed therein, and any pigment component present.

Useful thermoplastic resins or polymers (B) include: ethylene binyl acetate (EVA) copolymers (Elvax® resins, E. I. du Pont de Nemours and Company, Wilmington, Del.), copolymers of ethylene and an α, β-unsaturated acid selected from the group consisting of acrylic acid and methacrylic acid, copolymers of ethylene (80 to 99.9%)/acrylic or methacrylic acid (20 to 0%)/alkyl ($C_1$ to $C_5$) ester of methacrylic or acrylic acid (0 to 20%), polyethylene, polystyrene, isotactic polypropylene (crystalline), ethylene ethyl acrylate series sold under the trademark Bakelite® DPD 6169, DPDA 6182 Natural and DTDA 9169 Natural by Union Carbide Corp., Stamford, Conn.; ethylene vinyl acetate resins, e.g., DQDA 6479 Natural and DQDA 6832 Natural 7 also sold by Union Carbide Corp.; Surlyn® ionomer resin by E. I. du Pont de Nemours and Company, Wilmington, Del., etc., or blends thereof, polyesters, polyvinyl toluene, polyamides, styrene/butadiene copolymers and epoxy resins. the synthesis of copolymers of ethylene and an α,β-ethylenically unsaturated acid of either acrylic acid or methacrylic acid is described in Rees U.S. Pat. No. 3,264,272, wherein the ethylene constituent is present in about 80 to 99.9% by weight and the acid component in about 20 to 0.1% by weight. A preferred copolymer is ethylene (90%% by weight)/methacrylic acid (10% by weight). The acid numbers of the copolymers range from 1 to 120, preferably 54 to 90. Acid no. is milligrams potassium hydroxide required to neutralize 1 gram of polymer. The melt index (g/10 min) of 100 to 500 is determined by ASTM D 1238, Procedure A. preferred copolymers of this type have an acid number of 66 and 60 and a melt index of 100 and 500 determined at 190° C., respectively.

Other resins include acrylic resins, such as a copolymer of acrylic or methacrylic acid (optional but preferred) and at least one alkyl ester of acrylic or methacrylic acid wherein alkyl is 1–20 carbon atoms, e.g., methyl acrylate (50–90%)/ methacrylic acid (0–20%)/ethylhexyl methacrylate (10–50%) (Preferred is methylmethacrylate (67%)/methacrylic acid (3%)/ethylhexyl acrylate (30%)); and other acrylic resins including Elvacite® acrylic resins, E. I. du Pont de Nemours and Company, Wilmington, Del. or blends of resins, and modified resins disclosed in El-Sayed et al. U.S. Pat. No. 4,798,778.

In addition, the resins have the following preferred characteristics:

1. Are able to disperse the colorant, e.g., pigment, etc.

2. Are substantially insoluble in the dispersant liquid at temperatures below 40° C., so that the resin will not dissolve or solvate in storage, 3. Solvate (i.e., become swollen, gelatinous, or softened) at temperatures above 50° C., 4. Are capable of being ground to form particles having median particle size (volume weighted less than 15 μm and with 90% of the particles (volume weighted) less than 30 μm, determined by Malvern 3600E described below, and 5. May be fused at temperatures in excess of 70° C.

The malvern 3600E Particle Sizer manufactured by Malvern, Southborough, Mass. uses laser diffraction light scattering of stirred samples to determine average particle sizes.

Suitable nonpolar liquid soluble charge director compounds (C), which are used in an amount of 0.1 to 1,000 mg/g, preferably 1 to 300 mg/g developer solids, include: anionic glyceride such as Emphos® F27-85, two commercial products sold by Witco Corp., New York, N.Y.; which are sodium salts of phosphated mono- and diglycerides with unsaturated and saturated acid substituents, respectively, lecithin, Basic Barium Petronate®, Neutral Barium Petronate®, Calcium Petronate®, Neutral Calcium Petronate®, oil-soluble petroleum sulfonates, Witco Corp., New York, N.Y.; and metallic soaps such as aluminum tristearate, aluminum disterate; barium, calcium, lead and zinc stearates; cobalt, manganese, lead and zinc linoleates, aluminum, calcium and cobalt octoates; calcium and cobalt oleates; zinc palmitate; calcium, cobalt, manganese, iron, lead and zinc naphthenates; calcium, cobalt, manganese, lead and zinc resinates, etc.

Additional components that can be present in the electrostatic liquid developer are colorants, such as pigments or dyes and combinations thereof, which preferably are present to render the latent image visible, which is important for many applications. The colorant may be present in the amount of up to about 60 percent by weight based on the total weight of developer solids, preferably 0.01 to 30% by weight based on the total weight of developer solids. The amount of colorant may vary depending on the use of the developer. Examples of suitable pigments include:

Other ingredients may be added to the electrostatic liquid developer, such as fine particle size oxides (e.g., silica, alumina, titania), preferably in the order of 0.5 μm or less dispersed in he resin. These oxides can be used alone or in combination with the colorant. Metal particles can also be added.

Another optional component of the electrostatic liquid developer is an adjuvant selected from the group consisting of polyhydroxy compound which contains at least 2 hydroxy groups, aminoalcohol compounds, polybutylene succinimide, metallic soaps, and aromatic hydrocarbon having a Kauri-buanol value of greater than 30. The adjuvants are generally used in an amount of 1 to 100 mg/g, preferably 1 to 200 mg/g developer solids. Examples of the various above-described adjuvants include:

polyhydroxy compounds: ethylene glycol, 2,4,7,9=tetramethyl- 5-decyn-4, 7-diol, poly(propylene glycol), pentaethylene glycol, tripropylene glycol, triethylene glycol, glycerol, pentaerythritol, glycerol-tri- 12 hydroxystearate, ethylene glycol monohydroxystearate, propylene glycerol monohydroxysterate, etc., as described in Mitchel U.S. Pat. No. 4,734,352;

PIGMENT LIST

| Pigment Brand Name | Manufacturer | Color Index Pigment |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® GR | Ciba-Geigy | Yellow 95 |
| Novoperm ® Yellow FGL | Hoechst | Yellow 97 |
| Hansa Brilliant Yellow 10GX | Hoechst | Yellow 98 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® GR | Ciba-Geigy | Yellow 95 |
| Novoperm ® Yellow FGL | Hoechst | Yellow 97 |

aminoalcohol compounds: triisopropanolamine, triethanolamine, ethanolamine, 3-amino-1-propanol, o-aminophenol, 5-amino- 1-pentanol, tetra (2-hydroxyethyl) ethylenediamine, etc., described in Larson U.S. Pat. No. 4,702,985;

PIGMENT LIST

| Pigment Brand Name | Manufacturer | Color Index Pigment |
|---|---|---|
| Hansa Brilliant Yellow 10GX | Hoechst | Yellow 98 |
| Lumogen ® Light Yellow | BASF | Yellow 110 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | Yellow 14 |
| L75-1331 Yellow | Sun Chem. | Yellow 17 |
| L75-2337 Yellow | Sun Chem. | Orange 83 |
| Hostaperm ® Orange GR | Hoechst | Orange 43 |
| Paliogen ® Orange | BASF | Orange 51 |

-continued

PIGMENT LIST

| Pigment Brand Name | Manufacturer | Color Index Pigment |
|---|---|---|
| Irgalite ® Rubine 4BL | Ciba-Geigy | Red 57:1 |
| Quind ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heucophthal ® Blue G KBT 583D | Heubach, Inc. | |
| Heliogen ® Blue L 6901F | BASF | Blue 15:2 |
| Heliogen ® Blue NBD 7010 | BASF | Blue:3 |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |
| Quindo ® Red R6713 | Mobay | |
| Indofast ® Violet | Mobay | Violet 23 |
| Monastrail ® Violet Maroon B | Ciba-Geigy | Violet 42 |
| Sterling ® NS Black | Cabot | Black 7 |
| Sterling ® NSX 76 | Cabot | |
| Tipure ® R-101 | Du Pont | White 6 |

polybutylene/succinimide: OLOA®-1200 sold by Chevron Corp., analysis information appears in Kosel U.S. Pat. No. 3,900,412, column 20, lines 5 to 13; Amoco 575 having a number average molecular weight of about 600 (vapor pressure osmometry) made by reacting maleic anhydride with polybutene to give an alkenylsuccinic anhydride which in turn is reacted with a polyamine. Amoco 575 is 40 to 45% surfactant, 36% aromatic hydrocarbon, and the remainder oil, etc. These adjuvants are described in EI-Sayed and Taggi U.S. Pat. No. 4,702,984;

metallic soap: aluminum tristearate; aluminum distearate; barium, calcium, lead and zinc stearates; cobalt, manganese, lead and zinc linoleates; aluminum, calcium and cobalt octoates; calcium and cobalt oleates; zinc palmitate; calcium cobalt, manganese, lead and zinc naphthenates; calcium, cobalt, manganese, lead and zinc resinates, etc. the metallic soap is dispersed in the thermoplastic resin and described in Trout, U.S. Pat. No. 4,707,429; and aromatic hydrocarbon: benzene, toluene, naphthalene, substituted benzene and naphthalene compounds, e.g., triethylbenzene, xylene, dimethylethylbenzene, ethylmethylbenzene, propylbenzene, Aromatic 100 which is a mixture of $C_9$ and $C_{10}$ alkyl-substituted benzenes manufactured by Exxon Corp., etc., as described in Mitchell U.S. Pat. No. 4,631,244.

The resin particles of the developer may or may not be formed having a plurality of fibers integrally extending therefrom, but the presence of fibers extending from the toner particles is preferred. The term "fibers" as used herein means pigmented toner particles formed with fibers, tendrils, entacles, threadlets, fibrils, ligaments, hairs, bristles, or the like. Illustration of such fibers can be found in Landa et al., U.S. Pat. No. 4,842,974.

The charged electrostatic liquid developer can be prepared by a variety of processes as described in U.S. Pat. No. 4,707,429, issued Nov. 17, 1987. For example, the thermoplastic resin and nonpolar liquid are placed into a suitable mixing or blending vessel, such as an attritor, heated ball mill, heated vibratory mill such as a Sweco Mill manufactured by Sweco Col, Los Angeles, Calif., equipped with particulate media, for dispersing and grinding, Ross double planetary mixer manufactured by Charles Ross and Son, Hauppauge, N.Y. etc., or a two roll heated mill (no particulate media necessary). Generally, the resin, adjuvant if dispersed in the resin, nonpolar liquid and optional colorant are placed in the vessel prior to starting the dispersing step. Optionally, the colorant can be added after homogenizing the resin and the nonpolar liquid. Polar additive, similar to that described in Mitchell, U.S. Pat. No. 4,631,244, can also be present in the vessel, e.g., up to 100% based on the weight of polar additive and nonpolar liquid. The dispersing step is generally accomplished at elevated temperature, i.e., the temperature of ingredients in the vessel being sufficient to plasticize and liquefy the resin but being below that at which the nonpolar liquid or polar additive, if present, degrades and the resin and/or colorant decomposes. A preferred temperature range is 80° to 120° C. Other temperatures outside this range may be suitable, however, depending on the particular ingredients used. the presence of the irregularly moving particulate media is preferred to prepare the dispersion of toner particles. Other stirring means can be used as well, however, to prepare dispersed toner particles of proper size, configuration and morphology.

After dispersing the ingredients in the vessel, with or without a polar additive present, until the desired dispersion is achieved, typically 1 hour with the mixture being fluid, the dispersion is cooled, e.g., in the range of 0° to 50° C. Cooling may be accomplished, for example, in the same vessel, such as the attritor, while simultaneously grinding with particulate media to prevent the formation of a gel or solid mass; without stirring to form a gel or solid mass, followed by shredding the gel or solid mass and grinding, e.g., by means of particulate media; or with stirring to form a viscous mixture and grinding by means of particulate media. Additional liquid may be added at any step during the preparation of the liquid electrostatic toners to facilitate grinding or to dilute the toner to the appropriate % solids needed for toning. Additional liquid means nonpolar liquid, polar liquid or combinations thereof. Cooling is accomplished by circulating cold water or a cooling material through an external cooling jacket adjacent the dispersing apparatus, or by permitting the dispersion to cool to ambient temperature. The resin precipitates out of the dispersant during the cooling. Toner particles of median particle size (volume weighted) less than 15 μm, and with 90% of the particles (volume weighted) less than 30 μm as determined by a Malvern 3600E Particle Sizer or other comparable apparatus, are formed by grinding for r relatively short period of time.

After cooling and separating the dispersion of toner particles from the particulate media, if present, by means known to those skilled in the art, it is possible to reduce the concentration of the toner particles in the dispersion, impart an electrostatic charge of predetermined polarity to the toner particles, or a combination of these variations. One or more ionic or zwitterionic charge director compounds (C), of the type set out above, can be added to impart a charge. The addition may occur at any time during the process; preferably at the end of the process after the particulate media, if used, are removed and the concentration of toner particles is accomplished. If a diluting nonpolar liquid is also added, the charge director compound can be added prior to, concurrently with, or subsequent thereto. If an additional adjuvant compound of a type described above has not been previously added in the preparation of the developer, it can be added prior to or subsequent to the developer being charged.

Other process embodiments for preparing the electrostatic liquid developer include:

(A) dispersing a thermoplastic resin, and optionally a colorant and/or adjuvant in the absence of a nonpolar liquid having a Kauri-butanol value of less than 30 to form a solid mass, (B) shredding the solid mass, (C) grinding the shredded solid mass by means of particulate media in the presence of a liquid selected from the group consisting of a polar liquid having a Kauri-butanol value of at least 30, a nonpolar liquid having a Kauri-butanol value of less than 30, and combinations thereof, (D) separating the dispersion of toner particles having an average by area particle size of less than 10 μm from the particulate media, and (E) adding to the dispersion a nonpolar soluble charge director compound;

or (A) dispersing a thermoplastic resin, and optionally a colorant and/or adjuvant in the absence of a nonpolar liquid having a Kauri-butanol value of less than 30 to form a solid mass, (B) shredding the solid mass, (C) redispersing the shredded solid mass at an elevated temperature in a vessel in the presence of a nonpolar liquid having Kauri-butanol value of less than 30, and optionally a colorant, while maintaining the temperature in the vessel at a temperature sufficient to plasticize and liquefy the resin but below that at which the nonpolar liquid degrades and the resin and/or color decomposes, (D) cooling the dispersion, either (1) without stirring to form a gel or solid mass, followed by shredding the gel or solid mass and grinding by means of particulate media with or without the presence of additional liquid;

(2) with stirring to form a viscous mixture and grinding by means of particulate media with our without the presence of additional liquid; or (3) while grinding by means of particulate media to prevent the formation of a gel or solid mass with or without the presence of additional liquid;

(E) separation the dispersion of toner particles having an average by area particle size of less than 10 μm from the particulate media, and (F) adding to the dispersion a nonpolar soluble charge director compound.

The liquid electrostatic developer having a percent of solids based on the weight of the total developer of about 0.5 to about 4% by weight is present initially in the equipment. The system of the invention described above readily enables the percentage o solids in the liquid developer within such equipment to be maintained at the desired amount.

INDUSTRIAL APPLICABILITY

The system of this invention is useful in any equipment wherein liquid electrostatic developers are used to maintain the concentration of toner solids dispersed in the liquid developer at a desired amount without the need to dispose of excess carrier liquid. Such equipment is useful in printing, e.g., making office copies of black and white as well as various colors; or color proofing, e.g., a reproduction of an image using the standard colors: yellow, cyan, magenta together with black as desired; highlight color printing, e.g., printing of two colors usually black and a highlight color for letterheads, underlining, etc. Other uses for the liquid developers include: digital color proofing, lithographic printing plates, and resists.

EXAMPLE

The following examples wherein the parts and percentages are by weight illustrate, but do not limit, the invention. In the examples indices are determined by ASTM D 1238, Procedure A.

EXAMPLE 1

Black Liquid Toner Concentrate Preparation

One hundred and seventy point four (170.4) grams of NUCREL 599® (a copolymer of ethylene and methacrylic acid with a melt index at 190° C. of 500 and available from E. I. DuPont de Nemours & Company, Wilmington, Del.), 50.0 grams of the black pigment (Regal 330), 6.8 grams of aluminum stearate, Witco 22, (obtained from Witco Chemical Corporation, New York, N.Y.), and 307.4 grams of NORPAR 15® (obtained from Exxon Corporation) are added to a Union Process 1S attritor (obtained from Union Process Company, Akron, Ohio) charged with 0.1875 inch (4.76 millimeters) diameter carbon steel balls. The mixture was milled in the attritor which was heated in the temperature range of 86°–95° C. by running steam through the attritor jacket for 2 hours while maintaining a stir rate of 125 rpm. Then an additional 980.1 grams of Norpar 15 were added to the attritor and the attritor stir rate was increased to 200 rpm and the attritor contents were cooled by running cold water through the attritor jacket while the temperature dropped to 12° C. over 4.5 hours. Additional (a total of 1550 grams) NORPAR 15® was added to the attritor and the mixture was separated from the steel balls yielding a toner concentrate of 6.74% solids wherein solids include resin, charge adjuvant, and pigment and 93.26 percent Norpar 15. This black toner concentrate was used to make liquid developer in Example 4.

EXAMPLE 2

Base Polymer Preparation 1

Sequential Group Transfer Polymerization (GTP) of 2-Ethylhexyl Methacrylate (EHMA) and 2-Dimethylaminoethyl Methacrylate (DMAEMA) to Prepare the AB Diblock Copolymer Precursor of Protonated Ammonium or Quaternary Ammonium Block Copolymer Charge Directors.

AB diblock copolymer precursors were prepared by a standard group transfer sequential polymerization procedure (GTP) wherein the ethylhexyl methacrylate monomer was first polymerized to completion and then the 2-dimethylaminoethyl methacrylate monomer was polymerized onto the living end of the ethylhexyl methacrylate polymer. All glassware was first baked out in an air convection oven at about 120° C. for about 16–18 hours.

In a typical procedure, a 2 liter 3-neck round bottom flask equipped with a magnetic stirring football, an Argon inlet and outlet and a neutral alumina (150 grams) column (later to be replaced by a rubber septum and then a liquid dropping funnel) is charged through the alumina column, which is maintained under a positive Argon flow and sealed from the atmosphere, with 415 grams (2.093 mole) of freshly distilled 2-ethylhexyl methacrylate (EHMA) monomer. Next 500 ml of freshly distilled tetrahydrofuran solvent, distilled from sodium benzophenone, is rinsed through the same alumina column into the polymerization vessel. Subsequently, the GTP initiator, 15 ml of methyl trimethylsilyl dimethylketene acetal (12.87 grams; 0.0738 mole) is syringed into the polymerization vessel. The acetal was originally vacuum distilled and a middle fraction was collected and stored (under Argon) for polymerization initiation purposes. After stirring for about 5 minutes at ambient temperature under a gentle Argon flow, 0.1 ml of a 0.66M solution of tetrabutylammonium acetate (catalyst) in the same dry tetrahydrofuran was syringed into the polymerization vessel. After an additional hour stirring under Argon, the polymerization temperature peaked at about 50° C. Shortly thereafter, 90 grams (0.572 mole) of freshly distilled 2-dimethylaminoethyl methacrylate (DMAEMA) monomer was dropwise added to the polymerization vessel. The polymerization solution was stirred under Argon for at least 4 hours after the temperature peaked. Then 5 ml of methanol was added to quench the live ends of the fully grown copolymer. The above charges of initiator and monomers provide an Mn and average degree of polymerization (DP) for each block. For the EHMA non-polar B block, the charged Mn is 5,621 and the DP is 28.3 and for the DMAEMA polar A block, the charged Mn is 1,219 and the DP is 7.8. $^1$H-NMR analysis of a 20% (g/dl) $CDCl_3$ solution of the copolymer indicated a 77 to 78 mole percent EHMA content and a 22 to 23 mole percent DMAEMA content. GPC analysis was obtained on a fraction of the 1–2 gram sample of isolated polymer using three 250×8 mm Phenomenex Phenogel™ columns in series (100, 500, 1000 Angstrom) onto which was injected a 10 microliter sample of the block copolymer at 1% (wt/vol) in THF. The sample was eluted with THF at a flow rate of 1 ml/min and the chromatogram was detected with a 254 nm UV detector. The GPC chromatogram was bimodal with the major peak occurring at 13.4–22.2 counts and the minor low molecular weight peak at 23.5–28.3 counts. The major peak has a polystyrene equivalent number average molecular weight (Mn) of 2346 and a weight average molecular weight (Mw) of 8398 (MWD=3.58).

A small (1–2 grams) portion of the AB diblock copolymer can be isolated for GPC and $^1$H-NMR analyses by precipitation into 10X its solution volume of methanol using vigorous mechanical agitation. The precipitated copolymer was then washed on the funnel with more methanol and was then dried overnight in vacuo (about 0.5 Torr) at about 50° C.

EXAMPLE 3

Base Polymer Preparation 2

A second AB diblock copolymer was prepared as described in Example 2 using the same polymerization procedure, conditions, and quantities of the same materials except that more ketene acetal was used to initiate this GTP. In this preparation, 26 ml of the ketene acetal (22.31 grams; 0.1280 mole) were used to initiate the polymerization. The above monomer charges are equivalent to 78.5 mole percent EHMA and 21.5 mole percent DMAEMA which corresponds to an EHMA average DP of 16.4 (Mn of 3243) and a DMAEMA average DP of 4.5 (Mn of 703). After solvent exchange as described above in Example 2, a 1–2 gram sample of the AB diblock copolymer was isolated by evaporating the toluene in a vacuum oven overnight at about 55° C. and 0.5 Torr and the dried AB diblock copolymer was next sampled for $^1$H-NMR analysis. $^1$H-NMR analysis of a 20% (g/dl) $CDCl_3$ solution of the AB diblock copolymer indicated about a 79 to 80 mole percent EHMA repeat unit content and a 20 to 21 mole percent DMAEMA repeat unit content. GPC analysis, as described in Example 2, indicated the major peak at 14.5 to 19.9 counts to have a number average molecular weight of 3,912 and a weight average molecular weight of 6,222 (MWD of 1.59). Two barely discernible broad low molecular weight peaks were located at 20–25.1 and 25.1–30 counts.

EXAMPLE 4

Base Polymer Preparation 3

A third AB diblock copolymer was prepared as described in Example 3 using the same polymerization procedure and conditions except the polymerization scale was increased by a factor of three. $^1$H-NMR analysis of a 17.5% (g/dl) $CDCl_3$ solution of an isolated portion of the unprotonated block copolymer indicated about a 77 to 78 mole percent EHMA repeat unit content and a 22 to 23 mole percent DMAEMA repeat unit content. GPC analysis of this unprotonated block copolymer, as described in Example 2, indicated the major peak at 14.4–22.6 counts to have a number average molecular weight of 2253 and a weight average molecular weight of 5978 (MWD of 2.65). A broad low molecular weight peak was located at 24–32 counts. A hydrogen bromide protonated charge director was prepared from this AB diblock copolymer solution in toluene as described in Example 5.

EXAMPLE 5

Charge Director Preparation from Base Polymer Preparation 3

Preparation of the hydrogen bromide ammonium salt AB diblock copolymer charge director, poly[2-ethylhexyl methacrylate (B block)-co-N,N-dimethyl-N-ethyl methacrylate ammonium bromide (A block)], from poly [2-ethylhexyl methacrylate (B block)-co-N,N-dimethylamino-N-ethyl methacrylate (A block)] prepared in Example 4 and aqueous hydrogen bromide:

To a 1 liter Erlenmeyer flask was added 294.93 grams of a 50.86 weight percent toluene solution of an AB diblock copolymer (150 grams) from poly (2-ethylhexyl methacrylate-co-N,N-dimethylamino-N-ethyl methacrylate) prepared in Example 4 comprised of 18.23 weight percent 2-dimethylaminoethyl methacrylate (DMAEMA) repeat units and 81.77 weight percent 2-ethylhexyl methacrylate (EHMA) repeat units. The 150 grams of AB diblock copolymer contains 27.35 grams (0.174 mole) of DMAEMA repeat units. To this magnetically stirred AB diblock copolymer toluene solution at about 20° C. was added 28.73 grams (0.170 mole of HBr) of 48% aqueous hydrobromic acid (Aldrich). The charged aqueous hydrobromic acid targeted 98.0 mole percent of the available DMAEMA repeat units in the AB diblock copolymer. A 2° C. exotherm was observed in the first 5 minutes, but after the addition of 23.4 grams of methanol, an 8° C. exotherm was observed in the next five minutes and then the temperature of the contents of the reaction vessel slowly began to drop. To reduce the viscosity of the reaction mixture, 150 grams additional toluene was added to give a 33 weight percent solids solution of moderate viscosity. This solution was magnetically stirred for 20 hours at ambient temperature and was then diluted with Norpar 15 (2850 grams) to give a 5 weight % (based on the corresponding starting weight of the AB diblock copolymer from Example 4) charge director solution after toluene and methanol rotoevaporation. Toluene and methanol were rotoevaporated at 50°–60° C. for 1–2 hours at 40–50 mm Hg from 500–600 ml portions of the charge director solution until the entire sample was rotoevaporated. The 5 weight % Norpar 15 solution of poly(2-ethylhexyl methacrylate-co-N, N-dimethyl-N-ethyl methacrylate ammonium bromide) had a conductivity of 1700 to 1735 pmhos/cm and was used to charge liquid toner concentrate prepared in Example 1 to give a black liquid developer as described in Example 6.

EXAMPLE 6

Black Liquid Developer Charged with Poly[2-Ethylhexyl Methacrylate (B Block)-CO-N,N-Dimethyl-N-Ethyl Methylacrylate Ammonium Bromide (A Block)

A black liquid toner dispersion (developer) was prepared by taking 890.2 grams of liquid toner concentrate (6.74% solids in Norpar 15 with the ink solids being thermoplastic resin, pigment, and charge adjuvant) from Example 1 and adding to it 2073.8 grams of Norpar 15, and 36.0 grams of charge director (5% solids in Norpar 15) from Example 5. This resulted in a liquid toner dispersion of 2% toner solids and 30 mg charge director (CD) to 1 gram of toner solids or 3.0% charge director per gram of toner solids. This black developer was then used in the following procedures to dispersed black liquid toner. The toner settle immediately in large clumps which were in excess of 100 microns and were visible to the eye. This mixture was then dispersed with the present invention which comprised two opposing conductive gold electrodes which were evaporated onto a piece of 1 mil mylar which was 1 mm wide by 50 mm long channel cut into it. This channel allowed ink to flow passed the 14 mm wide by 30 mm long electrodes. The mylar was clamped between two glass plates to form a cavity 1 mm high, 50 mm long and 0.001 inches wide. this cavity allowed ink to flow passed the opposing electrodes which were 14 mm long. The conductive electrodes were connected to a voltage supply (Trek Model 610B) and a 50 MHz pulse generator (Model 801). A voltage pulse of 1500 VDC for 300 ms was applied to the electrodes to produce a useful particle size distribution of 2–6 m. This particle size was determined by microscopic examination.

It is, therefore, evident that there has been provided, in accordance with the present invention, a system for replenishing liquid electrostatic developer that fully satisfies the aims and advantages hereinbefore set forth. While this invention has been described in conjunction with one embodiment thereof, it is evident that many alternatives, modifications and variations will be apparent to those skilled in the art. Accordingly, it is intended to embrace all such alternatives, modification and variations as fall within the spirit and broad scope of the appended claims.

What is claimed is:

1. A process for the preparation of liquid developers comprising subjecting a liquid developer concentrate including a resin, a pigment, and a liquid to a pulsed electric field to form a liquid dispersion, said subjecting step comprises applying a voltage ranging from about 1000 V/mm to about 1500 V/mm to produce the electric pulses.

2. A process which comprises subjecting a liquid developer including a thermoplastic resin, a pigment, and a charge adjuvant dispersed in a liquid to a pulsed of electric fields thereby enabling redispersion of said resin, pigment and charge adjuvant in the liquid, said subjecting step comprises applying a voltage ranging from about 1000 V/mm to about 1500 V/mm to produce the electric pulses.

3. A process in accordance with claim 2, wherein said subjecting step comprises applying the electric pulses for a period of time of from about 0.05 seconds to about $3.0\times10^{-5}$ seconds.

4. A process in accordance with claim 2, wherein said subjecting step comprises breaking apart of the solids of resins, pigment and charge adjuvant to subsequent to the use of electric field pulse.

5. A process in accordance with claim 2, wherein said subjecting step reduces the solids of resins, pigment and charge adjuvant in size subsequent to the electric field pulses being applied thereon.

6. A process in accordance with claim 5, further comprising selecting particles ranging from about 10 to about 200 microns in average volume diameter prior to said subjecting step.

7. A process in accordance with claim 5, wherein the particles in size subsequent to the electric field pulses being applied thereon from about 1 to about 6 microns average volume diameter.

8. A process in accordance with claim 2, wherein said subjecting step comprises selecting a liquid developer including (A) a liquid with a viscosity of from about 0.5 to about 20 centipoise and resistivity greater than or equal to $5\times10^9$ ohm-cm; (B) thermoplastic resin particles with an average volume particle diameter of from about 0.1 to about 30 microns; (C) insoluble charge adjuvant; and (D) a charge director and wherein the charge adjuvant is associated with or combined with said resin and said pigment.

9. A process in accordance with claim 8, wherein said using step comprises selecting a pigment which is present in an amount of about 0.1 to about 60 percent by weight based on the total weight of the developer solids of resin, and pigment.

10. A process in accordance with claim 8, wherein said using step comprises selecting a pigment which is black, cyan, magenta, yellow, or mixtures thereof.

11. A process in accordance with claim 8, wherein said using step comprises selecting a liquid developer including component (A) which is present in an about of from about 85 percent to about 99.9 percent by weight, based on the total weight of the liquid developer, the total weight of developer solids is from about 0.1 percent to about 15 percent by weight, and component (D) which is present in an amount of from about 5 to about 1,000 milligrams/gram developer solids.

12. A process in accordance with claim 8, wherein said using step comprises adding a second charge adjuvant selected from the group consisting of paratoluenesulfonic acid and polyphosphoric acid to the liquid developer.

13. A process in accordance with claim 8 wherein said using comprises selecting a liquid which is an aliphatic hydrocarbon.

14. An apparatus for dispersing a liquid developer including (A) a nonpolar liquid, (B) thermoplastic resin particles, and (C) a charge director compound; the apparatus comprising:

a dispersing vessel containing aggregates of thermoplastic resin particles composed particles (B) and component (A); and means for applying a voltage ranging from about 1000 V/mm to about 1500 V/mm to produce the electric pulses in said dispersing vessel for separating the aggregates to form dispersed resin particles.

15. The apparatus according to claim 14, wherein said applying means comprises;

a voltage supply;

a first conductor electrically connected to said voltage supply; and a second conductor, electrically connected to said voltage supply, spaced from first conductor and with aggregates of thermoplastic resin particles composed particles (B) and component (A) being interposed therebetween so that when a voltage is applied to said first conductor and said second conductor the aggregates are subjected to the pulsed electrical field.

16. The apparatus according to claim 15, further comprising:

a liquid toner concentrate vessel having aggregates of thermoplastic resin particles including 50 to 100% by weight of particles (B), and 0 to 50% by weight of component (A);

a liquid vessel containing component (A);

means for supplying the aggregates of thermoplastic resin particles from said concentrate vessel to said dispersing vessel; and means for supplying component (A) from said liquid vessel to said dispersing vessel.

17. The apparatus according to claim 15, wherein:

the nonpolar liquid comprises a Kauri-butanol value of less than 30;

the thermoplastic resin particles comprising a median particle size (volume weighted)(less than 15 μm, and with 90% of the particles (volume weighted) less than 30 μm; and the charge director compound comprised of about 0.5 to 4% of solid in the liquid developer by weight based on the total weight of liquid developer.

18. The apparatus according to claim 17, wherein the dispersed resin particles comprise a volume average particle size of less than 15 μm, with 90% of the particles being less than 30 μm, the dispersion containing about 0.5 to 20% by weight particles (B) and about 99.5 to 80% by weight of component (A).

19. The apparatus according to claim 18, further comprising:

means for supplying and metering the dispersion of thermoplastic resin particles from said dispersing vessel into said supply vessel to be replenished to maintain the concentration of solids in the liquid developer in the range of about 0.5 to 4% by weight based on the total weight of liquid developer; and a supply vessel storing the liquid developer.

20. The apparatus according to claim 16, wherein said liquid concentrate vessel, or said liquid vessel comprises the charge director compound, or said supply vessel.

21. The apparatus according to claim 20, wherein said supply vessel comprises the charge director compound.

22. A process which comprises subjecting a liquid developer including a thermoplastic resin, a pigment, and a charge adjuvant dispersed in a liquid to a pulsed of electric fields thereby enabling redispersion of said resin, pigment and charge adjuvant in the liquid and wherein the particles in size subsequent to the electric field pulses being applied thereon from about 1 to about 6 microns average volume diameter.

23. A process which comprises subjecting a liquid developer including a thermoplastic resin, a pigment, and a charge adjuvant dispersed in a liquid to a pulsed of electric fields thereby enabling redispersion of said resin, pigment and charge adjuvant in the liquid and wherein said subjecting step comprises applying the electric pulses for a period of time of from about 0.05 seconds to about $3.0\times10^{-5}$ seconds.

* * * * *